May 24, 1927.
J. O. ROLLINS
1,629,639
JAR CLOSURE
Filed Dec. 26, 1924
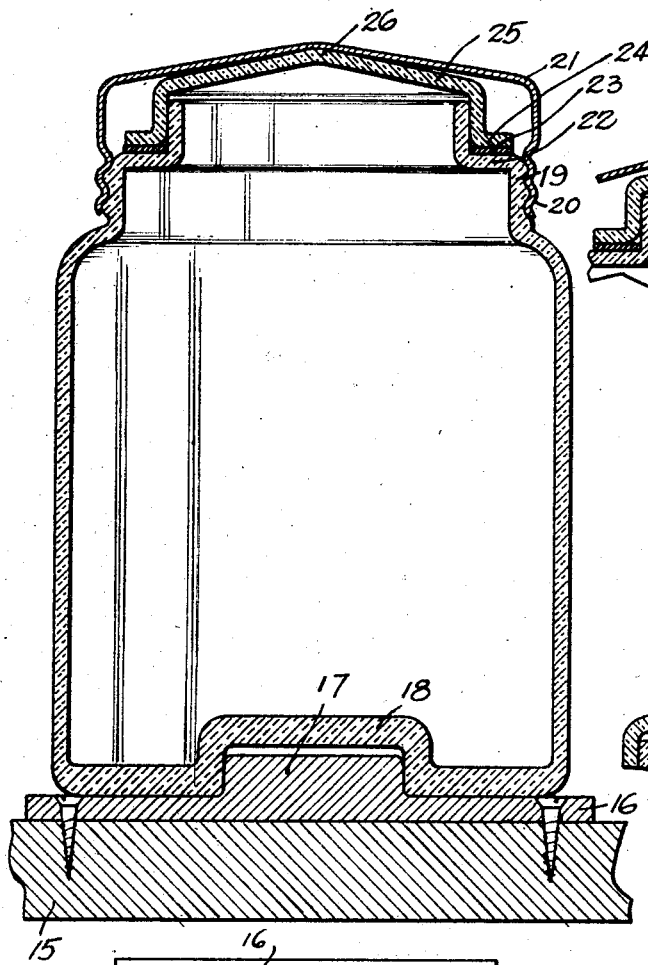
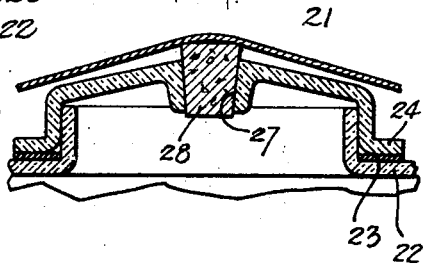
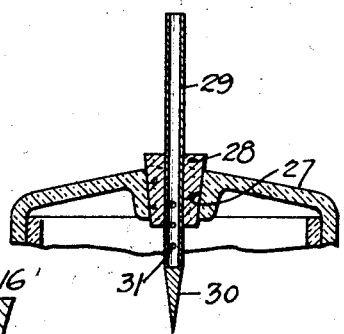
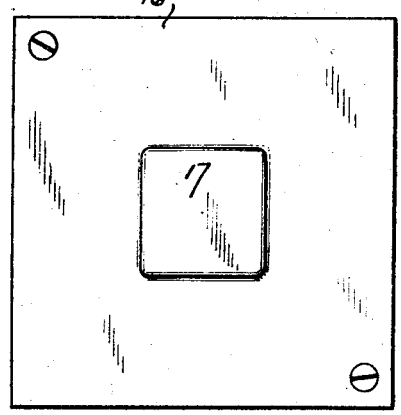
Inventor
JOHN O. ROLLINS
By Munn & Co.
Attorneys Patented May 24, 1927.

1,629,639

UNITED STATES PATENT OFFICE.

JOHN O. ROLLINS, OF WEST LOS ANGELES, CALIFORNIA.

JAR CLOSURE.

Application filed December 26, 1924. Serial No. 758,190.

My invention relates to preserving jar closures, and the purpose of my invention is the provision of a jar closure which can be readily operated to hermetically seal the contents of a jar and to allow the ready opening thereof, so that access to the contents may be had.

It is also a purpose of my invention to provide a jar closure including a screw cap and a closure cap having conical surfaces which co-operate so that when the screw cap is screwed home on the jar it will operate to force the closure cap into tight engagement with the jar to hermetically seal its contents.

It is also a purpose of my invention to provide a jar closure having a vent opening to provide an air entrance to the jar, thus greatly facilitating the removal of the closure.

A further purpose of my invention is the provision of a jar constructed to co-operate with a stationary element to facilitate holding of the jar to permit removal of the closure.

I will describe only two forms of jar closures and one form of jar, all embodying my invention, and will then point out the novel features thereof in claims.

In the accompanying drawings,

Figure 1 is a view showing in vertical section one form of jar closure and jar embodying my invention;

Figure 2 is a fragmentary sectional view showing another form of jar closure embodying my invention;

Figure 3 is a fragmentary sectional view showing one form of venting instrument in applied position with respect to the vent plug of the jar closure;

Figure 4 is a top plan view of the head and plate shown in Figure 1.

Similar reference characters refer to similar parts throughout the several views.

Referring specifically to the drawings and particularly to Figure 1, 15 designates a support, such as a table or the like, upon which is secured a plate 16 formed centrally thereof with a projection 17 of angular form, which, in the present instance, is shown as square.

A jar formed of glass or other suitable material is formed at its bottom to provide a socket 18 having the same contour as the projection 17, so as to receive the latter, and to thereby hold the jar against rotation on the plate. The mouth of the jar is formed with an annular collar 19 which is exteriorly threaded to engage with the threads 20 of a screw cap 21, the latter being preferably formed of metal. The jar neck is formed to provide an annular shoulder 22 upon which a rubber gasket 23 is adapted to repose, so as to be interposed between the shoulder and a flange 24 formed on a closure cap 25.

As clearly shown in Figure 1, the screw cap 21 and the closure cap 25 are of attenuated conical form so as to provide at the vertical axes of the two a bearing 26 on which the screw cap is adapted to rotate during the application of the cap to the jar to force the closure cap downwardly so that its flange 25—24 will be pressed into firm engagement with the gasket 23 to provide a fluid tight joint between the jar neck and the jar cap.

It is to be particularly noted that because of the conical form of the closure cap and screw cap a small bearing surface between the two is provided to eliminate undue friction in facilitating the rotation of the screw cap, and at the same time exerting sufficient pressure on the closure cap to produce the fluid tight joint.

In the form of closure cap just described, difficulty may be encountered in unscrewing the cap 21, because of the fact that no means is provided for admitting air to the jar. To overcome this difficulty, the jar is placed on the plate 16 so that the socket 18 receives the projection 17 when it will be clear that the jar is held against rotation so that sufficient force may be applied to the screw cap in effecting an unscrewing thereof.

Referring now to Figure 2, I have here shown another form of jar closure which is identical to the form shown in Figure 1 with the exception that the closure cap 25 is provided with a vent opening 27 normally closed by a plug 28, which, in the present instance, is a cork. This plug 28 is designed to normally project from the upper surface of the cap so that the crest of the screw cap will have contact therewith during its application to the jar, so that simultaneously with the screwing of the cap, the plug will be forced downwardly into the vent opening to provide an air tight seal. It has been found, in practice, that some difficulty is experienced in removing the closure cap from the jar subsequent to the removal of the screw cap. This difficulty is readily overcome by admitting air to the jar through the removal of the plug 28, and it will be understood that removal of the latter can be readily effected by the use of a cork screw.

Air may also be admitted to the jar through the use of a punching instrument which, as shown in Figure 3, comprises a tube 29 pointed at one end, as indicated at 30, and provided with ports 31 above the pointed end through which air may pass through the tube and into the jar when the instrument is in applied position with reference to the plug, as shown in Figure 3. It will be understood that the instrument can be readily forced through the plug 28 subsequent to the removal of the screw cap, and that the closure cap can be removed from the jar by lifting the instrument.

Although I have herein shown and described only one form of jar and means for preventing rotation thereof, two forms of jar closures and one form of punching instrument, all embodying my invention, it is to be understood that various changes and modifications may be made therein without departing from the spirit of my invention and the spirit and scope of the appended claims.

What is claimed is:

1. In combination, a jar having a neck provided with an annular shoulder, a gasket seating against the shoulder, a closure cap removably fitted on the neck and having a portion adapted to bear against the gasket, the cap being provided centrally with a tapered opening, a plug removably fitted in the opening and projecting above the plane of the cap, and means separable from the jar and adjustable vertically on the latter with respect to the cap operating when moved towards the cap to engage the projecting portion of the plug so as to force the latter into sealing engagement with its opening and as a result of the force exerted against the plug to simultaneously force the closure cap into sealing engagement with said annular shoulder.

2. In combination, a jar having a neck provided exteriorly with an annular shoulder, a gasket seating against the shoulder, a closure cap having a depending flange surrounding the neck and an outwardly extending flange resting on the gasket, the cap having a thickened central portion provided with an axial tapered opening, a tapered plug removably fitted in the opening and projecting above the cap, and a conical cap having a depending annular flange threaded for engagement with the jar and operating when screwed upon the jar to engage the projecting portion of the plug so as to force the latter downwardly into sealing engagement with its opening and to simultaneously force the closure cap downwardly as a result of the pressure exerted against the plug, to thereby effect sealing engagement of the flange of the closure cap with said annular shoulder.

JOHN O. ROLLINS.